United States Patent
Roake et al.

(10) Patent No.: US 11,138,338 B2
(45) Date of Patent: Oct. 5, 2021

(54) STATISTICAL PROPERTY PRESERVING PSEUDONYMIZATION

(71) Applicant: EntIT Software LLC, Sunnyvale, CA (US)

(72) Inventors: Timothy Roake, Sunnyvale, CA (US); Luther Martin, Sunnyvale, CA (US)

(73) Assignee: Micro Focus LLC, Santa Clara, CA (US)

( * ) Notice: Subject to any disclaimer, the term of this patent is extended or adjusted under 35 U.S.C. 154(b) by 150 days.

(21) Appl. No.: 15/926,296

(22) Filed: Mar. 20, 2018

(65) Prior Publication Data

US 2019/0294819 A1  Sep. 26, 2019

(51) Int. Cl.
*G06F 21/62* (2013.01)
*H04L 9/06* (2006.01)
*G06F 21/60* (2013.01)

(52) U.S. Cl.
CPC ........ *G06F 21/6254* (2013.01); *G06F 21/602* (2013.01); *H04L 9/0631* (2013.01)

(58) Field of Classification Search
CPC ... G06F 21/6254; G06F 21/602; H04L 9/0631
USPC .......................................................... 726/26
See application file for complete search history.

(56) References Cited

U.S. PATENT DOCUMENTS

| | | | |
|---|---|---|---|
| 9,349,026 B2 | 5/2016 | Gianniotis et al. | |
| 9,361,481 B2 | 6/2016 | LaFever et al. | |
| 9,432,181 B2 | 8/2016 | Minematsu | |
| 2010/0211787 A1* | 8/2010 | Bukshpun | H04L 9/065 713/170 |
| 2013/0177155 A1* | 7/2013 | Akhavan-Toyserkani | H04L 9/0662 380/255 |
| 2013/0238646 A1* | 9/2013 | Maro | G06F 21/6227 707/758 |
| 2014/0156990 A1* | 6/2014 | Dare | H04L 63/0823 713/156 |
| 2014/0201519 A1* | 7/2014 | Dare | H04L 9/3268 713/156 |
| 2015/0143133 A1* | 5/2015 | Burnett | G06F 21/6209 713/189 |
| 2016/0344702 A1* | 11/2016 | Ukena | G06F 21/6245 |

(Continued)

FOREIGN PATENT DOCUMENTS

EP  2124166 A1  11/2009
WO  WO2014075836 A1  5/2014

OTHER PUBLICATIONS

Alfalahi, Alyaa; "Pseudonymisation of Personal Names and other PHIs in an Annotated Clinical Swedish Corpus"; DSV, Stockhom University; Forum 100, 164 40; Kista, Sweden; E-mail: alyalfa@dsv.su.se, sarabri@dsv.su.se, hercules@dsv.su.se; pp. 49-54; 6 pages.

(Continued)

*Primary Examiner* — Teshome Hailu (57) ABSTRACT

A technique includes accessing data representing a plurality of values; and determining a pseudonym value for a given value of the plurality of values. Determining the pseudonym includes encrypting the given value to provide a first encrypted value; encrypting an attribute that is associated with the given value to provide a second encrypted value; and generating the pseudonym value based on the first encrypted value and the second encrypted value.

19 Claims, 7 Drawing Sheets

(56) References Cited

U.S. PATENT DOCUMENTS

2017/0177683 A1\* 6/2017 Koike .................. G06F 7/026
2017/0272472 A1 9/2017 Adhar

OTHER PUBLICATIONS

Heurix, Johannes; "Pseudonymization with Metadata Encryption for Privacy-Preserving Searchable Documents"; IEE computer society; 2012 45th Hawaii International Conference on System Sciences; IEEE, DOI 10.1109/HICSS.2012.491; 2012; pp. 3011-3020; 10 pages.

Narayanan, Arvind; "Robust De-anonymization of Large Sparse Datasets"; IEEE Symposium on Security and Privacy, 2008; 978-0-7695-3168-7 /08 $25.00 © 2008 IEEE, DOI 10.1109/SP; pp. 111-125; 15 pages.

Tsiafoulis, Stergios G.; "Maximum Entropy Oriented Anonymization Algorithm for Privacy Preserving Data Mining"; ResearchGate, DOI:10.1007/978-3-642-33448-1_2; www.researchgate.net/publication/287538650; Jan. 2012; 9 pages.

Campero, Alejandro N.; "Balancing Utility and Privacy of High-Dimensional Archives Datasets: Mobile Phone Metadata"; Submitted to Massachusetts Institute of Technology. Sep. 2015; 76 pp.

\* cited by examiner

STATISTICAL PROPERTY PRESERVING PSEUDONYMIZATION

BACKGROUND

A business organization (a retail business, a professional corporation, a financial institution, and so forth) may collect, process and/or store data that represents sensitive or confidential information about individuals or business organizations. For example, the data may be personal data that may represent names, residence addresses, medical information, salaries, banking information, and so forth. The data may be initially collected or acquired in "plaintext form," and as such may be referred to as "plaintext data." Plaintext data refers to ordinarily readable data. As examples, plaintext data may be a sequence of character codes, which represent the residence address of an individual in a particular language; or the plaintext data may be a number that that conveys, for example, a blood pressure reading.

DETAILED DESCRIPTION

For purposes of controlling access to sensitive information (e.g., information relating to confidential or sensitive information about one or more business enterprises and/or individuals) plaintext data items, which represent the sensitive information, may be converted, through a process called "pseudonymization," into corresponding pseudonyms, or pseudonym values. In this context, a "plaintext data item" (also referred to as "plaintext," or a "plaintext value" herein) refers to a unit of data (data representing a string, an integer, a real number, a date, and so forth) that represents ordinarily readable content. As examples, a plaintext data item, or value, may be a date, a number, a blood pressure measurement, a salary, and so forth. A pseudonym value ideally conveys no information about the entity that is associated with the corresponding plaintext value. The pseudonymization process may or may not be reversible, in that reversible pseudonym ization processes allow plaintext values to be recovered from pseudonym values, whereas irreversible pseudonym ization processes do not.

One way to convert a first dataset representing a collection of plaintext values into a corresponding second dataset representing a corresponding collection of pseudonym values is to apply an encryption cipher to the first dataset. As an example, the encryption may be format preserving encryption (FPE), which, as its name implies, preserves the format of the plaintext values. For example, the encryption of a sixteen digit credit card number results in a sixteen digit pseudonym.

The ciphertext resulting from the encryption of the plaintext values may be used as the pseudonym values. However, the encryption may alter, if not entirely obfuscate, properties of the plaintext values. For example, the encryption process may destroy information such as dataset averages and distributions, and the individual pseudonym values may have no statistical correlation with the original plaintext values. More specifically, the ciphertext may have a uniform random distribution, although the corresponding plaintext values may have a different statistical distribution, such as a normal, or Gaussian distribution.

The pseudonymization process may serve various purposes, such as regulating access to sensitive information (represented by the plaintext values) and allowing the sensitive information to be analyzed by third parties. For example, the sensitive data may be personal data, which represents personal information about the public, private and/or professional lives of individuals. In some cases, it may be useful to process pseudonymized data to gather statistical information about the underlying personal information. For example, it may be beneficial to statistically analyze pseudonymized health records (i.e., health records in which sensitive plaintext values have been replaced with corresponding pseudonym values), for purposes of gathering statistical information about certain characteristics (weights, blood pressures, diseases or conditions, diagnoses, and so forth) of particular sectors, or demographics, of the population. The pseudonymization process, such as the above-described process of generating pseudonym values by way of encryption, may, however, potentially alter, if not destroy, statistical properties of the personal information. In other words, a collection of plaintext values may have certain statistical properties that are represented by various statistical measures (means, variances, ranges, distributions, expected and so forth). These statistical properties may not be reflected in the corresponding set of pseudonym values, and accordingly, useful statistical information about the personal information may not be determined from the pseudonymized data.

In accordance with example implementations that are described herein, a pseudonym ization process converts plaintext values into corresponding pseudonym values in a process that preserves one or multiple statistical properties of the plaintext values. More specifically, in accordance with example implementations, an encryption-based pseudonymization process is used that, for each plaintext value, encrypts two data items: the plaintext value resulting in a first encrypted value; and ancillary data that is associated with the plaintext value, resulting in a second encrypted value. Thus, the pseudonymization process provides a set of first encrypted values and a set of second encrypted values.

The set of first encrypted values represents a random variable, and the set of second encrypted values represents a random variable. As discussed herein, these two random variables, in turn, may be used to produce a pseudonymized value dataset, which has statistical properties similar to the plaintext value dataset.

In the context of this application, "ancillary data" for a given plaintext value refers to additional or auxiliary data that is associated with a given plaintext value. For example, in accordance with some implementations, the ancillary data may be an index of the plaintext value. For example, a collection of plaintext values may be associated with data gathered from individuals, and the collection of plaintext values may have an associated sample size. Each index, in turn, may correspond to one of the individuals of the dataset. Thus, the sample size may be, for example, 1000 (corresponding to 1000 individuals, for example), and a given index, or index number, of 53 may correspond to, for example, a particular individual in the sample.

In accordance with further example implementations, the ancillary data may be data other than an index, or index number, which is associated with the plaintext value. For example, in accordance with some implementations, a particular plaintext value may be associated with such ancillary data as a name, a zipcode, an address, and so forth.

In accordance with some implementations, for a given plaintext value, the encrypted ancillary data may be used to impart a variance to the corresponding pseudonym value. In this regard, the encrypted ancillary data may be used to align a variance that is added to or subtracted from the encrypted plaintext value. Such variances, in turn, may cause the average and/or established distribution of the set of pseudonyms to approximate the average and/or distribution of the set of plaintext values. In accordance with further example implementations, the encrypted plaintext value and the associated encrypted ancillary data may form a random value pair; and the random value pairs (i.e., one random value pair for each plaintext value) may be applied as inputs to a statistical transformation for purposes of transforming the encrypted data into a set of pseudonymized values having one or multiple predetermined statistical properties that are similar to the set of plaintext values. In accordance with yet further example implementations, the encrypted plaintext value and its associated encrypted ancillary data may, for each plaintext value, form a variance input and a sinusoid input so that the variances and sinusoid inputs may be provided to a statistical transformation to transform the encrypted data into a set of pseudonyms having one or multiple predetermined statistical properties that are similar to the set of plaintext values.

Figure 1:
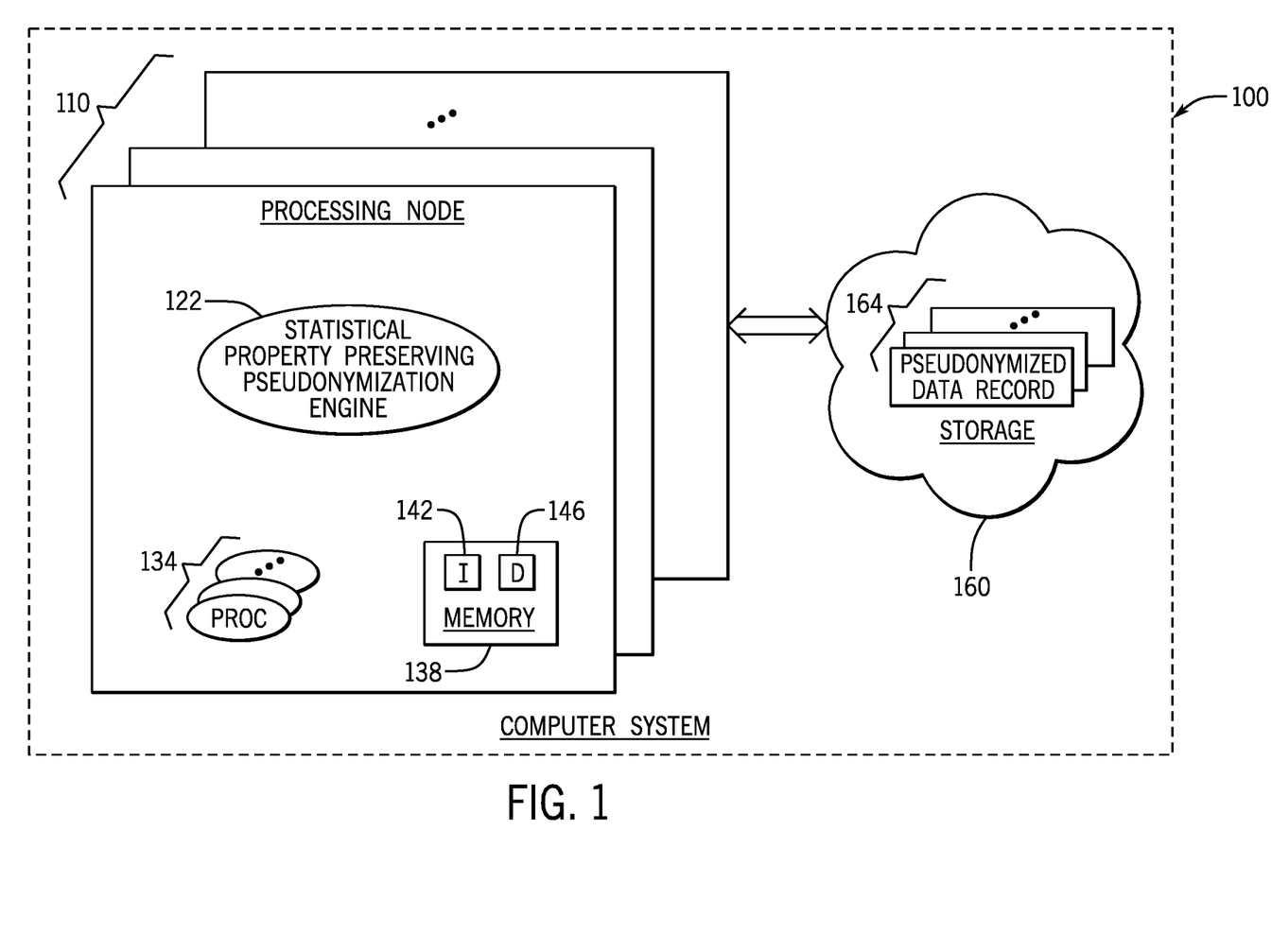
FIG. 1 is a schematic diagram of a computer system according to an example implementation.

Referring to FIG. 1, as a more specific example, in accordance with some implementations, a computer system 100 may include one or multiple statistical property preserving pseudonymization engines 122 (also called "pseudonymization engines 122" herein). In general, the computer system 100 may be a desktop computer, a server, a client, a tablet computer, a portable computer, a public cloud-based computer system, a private cloud-based computer system, a hybrid cloud-based computer system (i.e., a computer system that has public and private cloud components), a private computer system having multiple computer components disposed on site, a private computer system having multiple computer components geographically distributed over multiple locations, and so forth.

Regardless of its particular form, in accordance with some implementations, the computer system 100 may include one or multiple processing nodes 110; and each processing node 110 may include one or multiple personal computers, workstations, servers, rack-mounted computers, special purpose computers, and so forth. Depending on the particular implementations, the processing nodes 110 may be located at the same geographical location or may be located at multiple geographical locations. Moreover, in accordance with some implementations, multiple processing nodes 110 may be rack-mounted computers, such that sets of the processing nodes 110 may be installed in the same rack. In accordance with further example implementations, the processing nodes 110 may be associated with one or multiple virtual machines that are hosted by one or multiple physical machines.

In accordance with some implementations, the processing nodes 110 may be coupled to a storage 160 of the computer system 100 through network fabric (not depicted in FIG. 1). In general, the network fabric may include components and use protocols that are associated with any type of communication network, such as (as examples) Fibre Channel networks, iSCSI networks, ATA over Ethernet (AoE) networks, HyperSCSI networks, local area networks (LANs), wide area networks (WANs), global networks (e.g., the Internet), or any combination thereof.

The storage 160 may include one or multiple physical storage devices that store data using one or multiple storage technologies, such as semiconductor device-based storage, phase change memory-based storage, magnetic material-based storage, memristor-based storage, and so forth. Depending on the particular implementation, the storage devices of the storage 160 may be located at the same geographical location or may be located at multiple geographical locations. Regardless of its particular form, the storage 160 may store pseudonymized data records 164, i.e., data records in which certain plaintext data items have been replaced with pseudonyms.

In accordance with some implementations, a given processing node 110 may contain a pseudonymization engine 122, which is constructed to, for each plaintext value, apply an FPE cipher to the plaintext value and also apply the FPE cipher to ancillary data associated with the plaintext value to generate a corresponding pair of encrypted values. In accordance with example implementations, the encrypted value pairs are used to generate a set of pseudonym values in a manner such that the set of pseudonym values has one or multiple statistical properties that approximate, if not exactly match, statistical properties of the plaintext values.

In accordance with example implementations, the processing node 110 may include one or multiple physical hardware processors 134, such as one or multiple central processing units (CPUs), one or multiple CPU cores, and so forth. Moreover, the processing node 110 may include a local memory 138. In general, the local memory 138 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 138 may store various data 146 (data representing plaintext values, pseudonym values, ciphertext, ciphertext representing encrypted plaintext values, ciphertext representing encrypted ancillary data associated with the plaintext values, intermediate results pertaining to the pseudonymization process, and so forth). The memory 138 may store instructions 142 that, when executed by one or multiple processors 134, cause the processor(s) 134 to form one or multiple components of the processing node 110, such as, for example, the pseudonymization engine 122.

In accordance with some implementations, the pseudonymization engine 122 may be implemented at least in part by a hardware circuit that does not include a processor executing machine executable instructions. In this regard, in accordance with some implementations, the pseudonymization engine 122 may be formed in whole or in part by a hardware processor that does not execute machine executable instructions, such as, for example, an application specific integrated circuit (ASIC), a field programmable gate array (FPGA), and so forth. Thus, many implementations are contemplated, which are within the scope of the appended claims.

In accordance with example implementations, the encrypted ancillary data may be used to impart variances to the pseudonym values. The ancillary data may be used as a tweak parameter to an FPE or encryption cipher. Moreover, the pseudonymization process may be reversible, i.e., it may be possible to recover the original plaintext value from the pseudonym value.

More specifically, in accordance with example implementations, the encrypted plaintext value forms a base value, and the associated encrypted ancillary data determines how much to vary the base value, i.e., determines a variance to the base value for purposes of forming the corresponding pseudonym value. A determination may first be made regarding a variance range, i.e., the amount that the base value is allowed to vary. Secondly, a determination may be made of corresponding soft and hard limits to ensure that the pseudonym value does not vary outside of an absolute range.

As a more specific example, the plaintext values may be, for example, dates in the format of MM/DD/YYYY (where "M" represents a month digit, "D" represents a day digit and "Y" represents a year digit). For example, a set of dates may be soft limited to the range of Jan. 1, 1900 to Dec. 31, 2010, and a variance range of plus or minus five years may be imposed, resulting in a hard limit of Jan. 1, 1895 to Dec. 31, 2015. The pseudonymization process involves encrypting the plaintext dates to derive base dates, and varying the base dates based on the encrypted ancillary data.

For example, the date of "Dec. 3, 1965" may be encrypted, using an FPE cipher, to produce a ciphertext representing a date of "Jul. 30, 1948." In this manner, using an FPE cipher, "12," "03," and "1965" may be encrypted to "07," "30," and "1948," respectively. The "Jul. 30, 1948" base date may then be varied based on the encryption of the associated ancillary data. For example, the Dec. 3, 1965 plaintext date may be associated with an index number of 132 and a sample size of 2000. The ancillary data for this example may be the modulus, or remainder, which is produced by dividing the sample size by the associated index number. In other words, here, 2000 modulo 132, produces a remainder of 20. The remainder of 20 may be encrypted using FPE, which means that the corresponding ciphertext may be in a range of 0 to 99. This range, in turn may be partitioned into subranges, and each subrange may corresponding to a different variance to be added to the base date of Jul. 20, 1948. The variance may be positive or negative. As examples, a value "0" from the encrypted remainder may correspond to a variance of −1825 days (i.e., five years is subtracted from the base date); a value of "99" may correspond to a variance of +1825 days; a value of "20" (the ciphertext corresponding to the encryption of the ancillary data for this example) may correspond to a variance of −1095 days; and so forth. For this example, 1095 days are subtracted from the base date of Jul. 20, 1948 to produce a final pseudonym date of Jul. 21, 1945.

The above-described pseudonymization process is reversible (with knowledge of the encryption key), in accordance with example implementations. For the above example, it is known that the index of 132 is associated the pseudonym date of Jul. 21, 1945, and it is further known that the sample size is 2000. Therefore, reversing the pseudonymization for the above-described example, the variance is first removed. In other words, FPE encryption may be applied to the remainder of 20 (2000 modulo 132) to derive the variance of −1095. Correspondingly, a variance of +1095 days may be added to the pseudonym date of "Jul. 21, 1945" to produce a date of "Jul. 20, 1948." FPE decryption may then be applied to the date of "Jul. 20, 1948" to derive the original plaintext date of "Dec. 3, 1965."

Other techniques may be used to derive a variance from the encrypted ancillary data, in accordance with further implementations.

Figure 2:
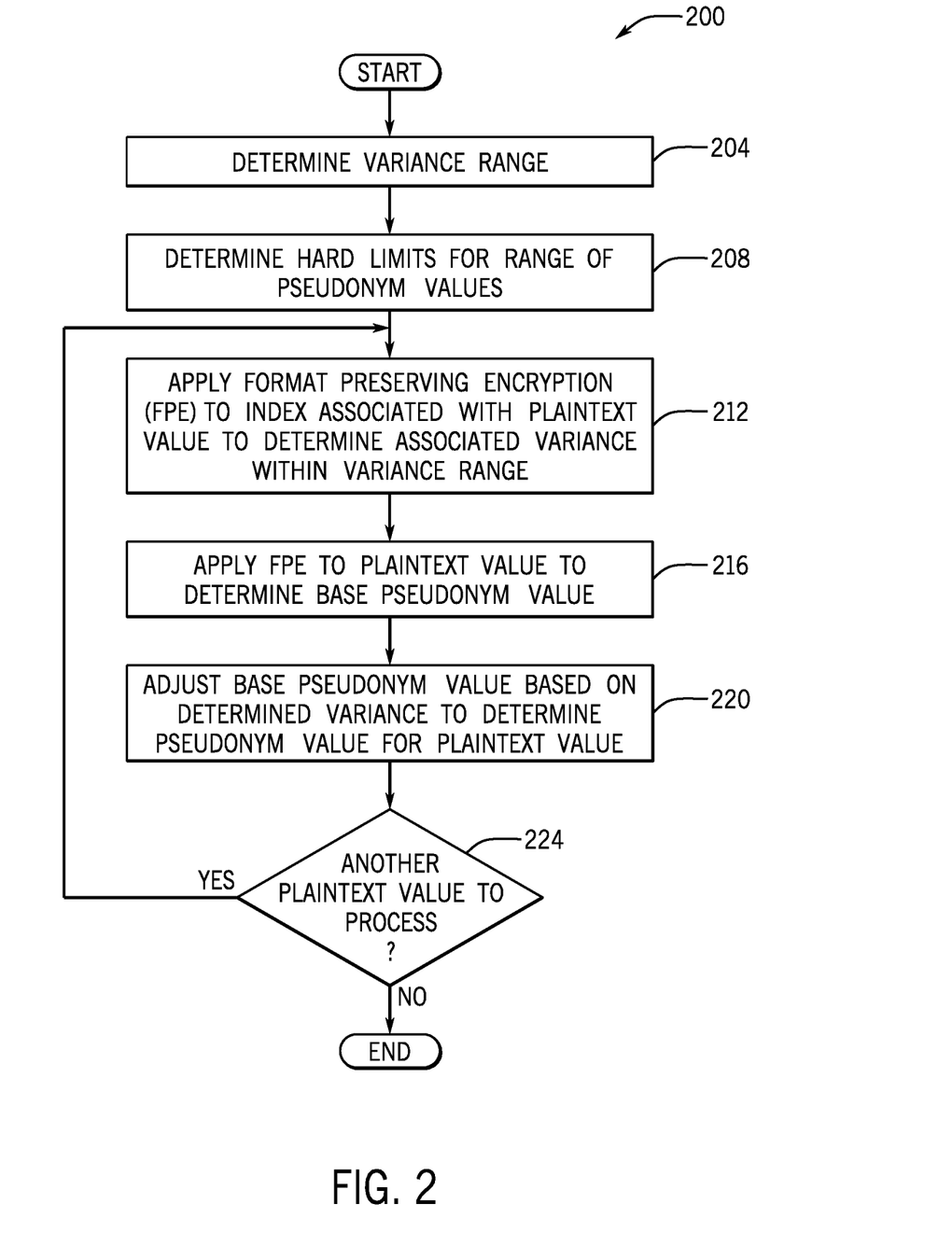
FIG. 2 is a flow diagram depicting a technique to generate pseudonym values from plaintext values and incorporate variances in the pseudonym values according to an example implementation.

Thus, as depicted in FIG. 2, in accordance with example implementations, the pseudonymization engine 122 may perform a technique 200 for purposes of generating a pseudonym value for a particular plaintext value. Referring to FIG. 2 in conjunction with FIG. 1, pursuant to the technique 200, a variance range is determined (block 204) and hard limits for the range of pseudonym values is determined, pursuant to block 208.

Next, the pseudonymization engine 128 may perform the following for each plaintext value. Pursuant to the technique 200, the pseudonymization engine 128 may apply (block 212) FPE to an index associated with the plaintext value to provide an associated variance within the variance range. As noted above, in accordance with some implementations, this may involve determining a result of the function (sample size) modulo index value to determine a remainder that is associated with the plaintext value. Moreover, the technique 200 includes applying the FPE to the plaintext value, pursuant to block 216, to determine a base pseudonym value. Pursuant to block 220, the base pseudonym value may then be adjusted, based on the determined variance, to determine a pseudonym value for the plaintext value. If, pursuant to decision block 224, there is another plaintext value to process, then, control may return to block 212. It is noted that although FIG. 2 depicts the processing of the plaintext values as being serial in nature, in accordance with further example implementations, the pseudonymization engine 128 may determine pseudonyms or pseudonym values in parallel. Thus, for example, in accordance with some implementations, the pseudonymization engine 128 may have multiple execution threads, for example, where each thread may determine one or multiple pseudonym values.

In accordance with further example implementations, the pseudonymization engine 122 may encrypt the plaintext values and the associated ancillary data for purposes of generating, for each plaintext value, a pair of random values. The random value pairs, in turn, serve as inputs to a statistical transformation, such as a Marsaglia polar transformation or a Box-Muller transformation. The statistical transformation produces a set of pseudonyms that have specific statistical distributions. The statistical transformation may be used to produce a dataset representing a set of pseudonym values that have a normal distribution, a log-normal distribution, and so forth, to reflect the statistical distribution of the corresponding set of plaintext values.

Figure 3:
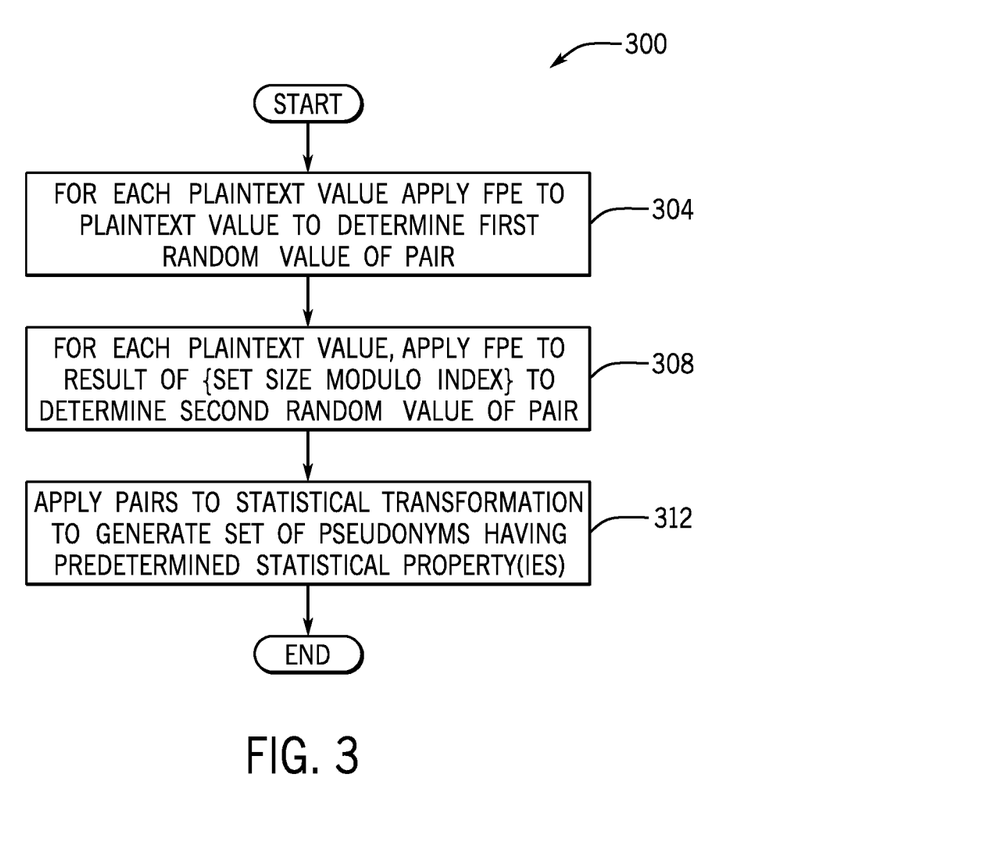
FIG. 3 is a flow diagram depicting a technique to generate a set of pseudonyms having predetermined statistical properties using a statistical transformation according to an example implementation.

FIG. 3 depicts a technique 300 that may be performed by the pseudonymization engine 122 to convert a set of plaintext values to a corresponding set of pseudonym values. Referring to FIG. 3 in conjunction with FIG. 1, the technique 300 includes, for each plaintext value, applying (block 304) FPE to the plaintext value to determine a first random value of a pair of random values associated with the plaintext value. Pursuant to block 308, the technique 300 includes, for each plaintext value, applying FPE to the result of the random set size modulo index to determine a second random value of the pair of random values associated with the plaintext value. Block 308 determines a remainder produced by dividing the associated index of the plaintext value into the sample set size. A statistical transformation may then be applied to the random value pairs, pursuant to block 312, to generate a set of pseudonyms having one or multiple predetermined statistical properties.

As a more specific example, in accordance with example implementations, the pseudonymization engine 122 may use a Box-Muller transformation to determine pseudonym values from plaintext values, and the pseudonymization engine 122 may use an inverse Box-Muller transformation to determine plaintext values from pseudonym values. The Box-Muller transformation takes two independent uniformly distributed sets of variables and returns values with a standard normal distribution.

Mathematically, the Box-Muller transformation may be described as follows:

$$Z_0 = R\cos(\theta) = \sqrt{-2\ln U_1}\cos(2\pi U_2),\qquad \text{Eq. 1,}$$

where "Zo" represents the transformed set of values having a normal distribution; and "$U_1$" and "$U_2$" represent the two uniformly distributed variables, where each variable is in the range of 0 to 1.

When data undergoes FPE, the data is effectively permuted within its data set. If a different tweak is used on each point, then the data set is approximately uniformly distributed. An example of a tweak may simply be the index of the data point within the set. There are advantages in returning a uniform distribution, as it increases entropy of the data reducing an attacker's ability to determine the underlying values. However, it may be beneficial to maintain some statistical properties, such as a normal or a log-normal distribution. The Box-Muller transform may be used to achieve this from the ciphertext that is produced by the FPE. The FPE ciphertext provides a first random uniformly distributed variable for the Box-Muller transformation. The second uniformly distributed variable may be provided, by, for example, performing an FPE permute operation on the index value itself (or on any associated unique data for each point, if available).

Figure 4:
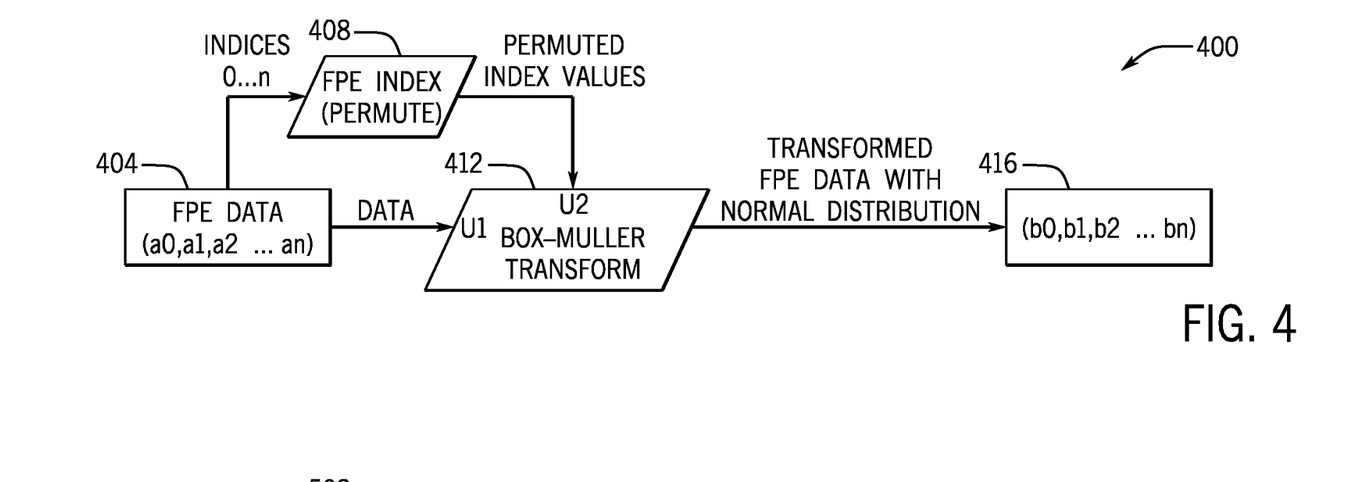
FIG. 4 is an illustration of a process flow to generate pseudonym values having a normal distribution using a Box-Muller transformation according to an example implementation.

As depicted in FIG. 4 in conjunction with FIG. 1, in accordance with example implementations, the pseudonymization engine 122 may perform a process flow 400 to determine a set of pseudonym values having a normal distribution. Pursuant to the process flow 400, the pseudonymization engine 122 performs (as represented at box 404) FPE on plaintext data values to produce FPE values ($a_0$, $a_1$, $a_2$ . . . $a_n$), where the subscript denotes the index associated with the FPE values. The FPE values, in turn, provide the $U_1$ variable for the Box-Muller transformation, as represented at reference number 412. Pursuant to box 408, the pseudonymization engine 122 also performs FPE on the indices to provide the $U_2$ variable for the Box-Muller transformation. As depicted at reference numeral 416, the Box-Muller transformation provides pseudonym values ($b_0$, $b_1$, $b_2$ . . . $b_n$), which have a normal distribution.

Figure 5:
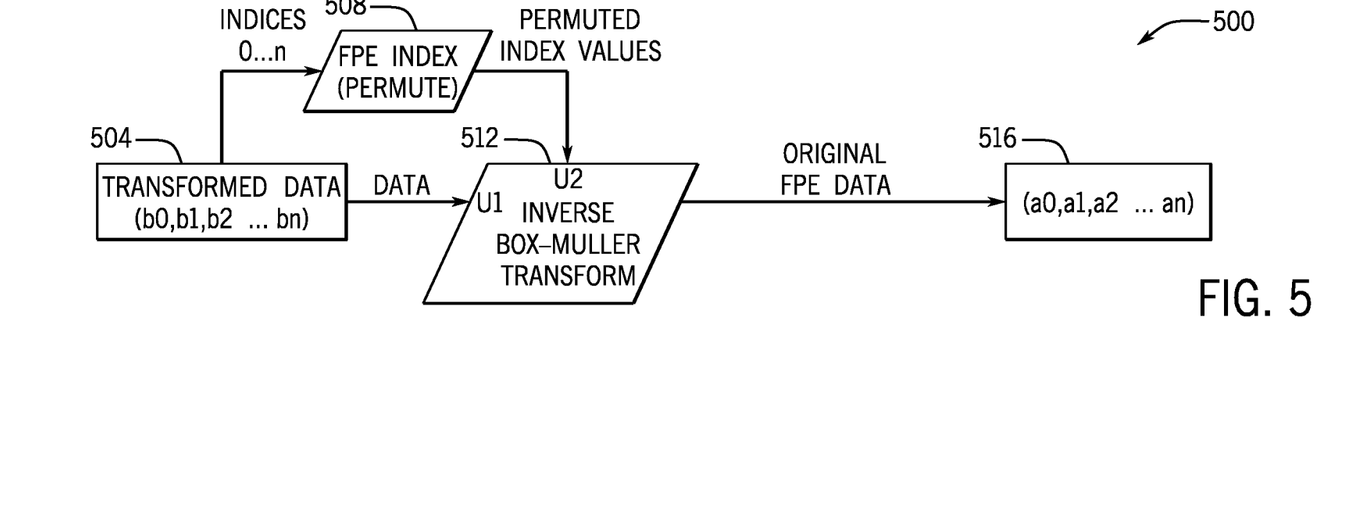
FIG. 5 is an illustration of a process flow of an inverse Box-Muller transformation according to an example implementation.

In accordance with example implementations, the pseudonymization process that is depicted in FIG. 4 is reversible. Referring to FIG. 5 in conjunction with FIG. 1, pursuant to a process flow 500, the pseudonymization engine 122 may apply an inverse Box Muller transformation (as depicted at reference numeral 512). The sinusoidal term, $\cos(2\pi U_2)$, may be regenerated exactly, as the $U_2$ variable may be regenerated from the permuted index value, as depicted at reference numeral 508. Using Eq. 1, the $U_1$ variable, which represents the original FPE values (i.e., $a_0$, $a_1$, $a_2$ . . . $a_n$, as depicted at reference numeral 516) may be determined as follows:

$$U_1 = e^{((Z_0/\cos(2\pi U_2))^2/-2)},\qquad \text{Eq. 2}$$

The pseudonymization engine 122 may decrypt the ($a_0$, $a_1$, $a_2$ . . . $a_n$) FPE values to provide the corresponding plaintext values.

In accordance with example implementations, the pseudonymization engine 122 may perform input data conversion as follows. The values for the $U_1$ and $U_2$ variables may each have a range between 0 and 1. These values are generated using the range of the true input data. For example, if there are 1000 data points that range between 0 to 99 then, the pseudonymization engine 122 generates the values for the $U_1$ and $U_2$ variables as follows:

$$U_1 = \text{data point}/100, \text{ and} \qquad \text{Eq. 3}$$

$$U_2 = \text{index}/1000,\qquad \text{Eq. 4}$$

In accordance with example implementations, the sinusoidal term, $\cos(2\pi U_2)$, is not allowed to be zero, as the term is used in the recovery function (Eq. 2). Therefore, in accordance with example implementations, the pseudonymization engine 122 may apply a constant offset to the sinusoidal term to ensure the term is not zero.

The pseudonymization engine 122 may also adjust the $\sqrt{-2\ln U_1}$ term of Eq. 1, as this term effectively squeezes the $U_1$ term into a smaller set, and reversing this would lead to collisions. Therefore, in accordance with example implementations, the pseudonymization engine 122 applies a scale factor to the $\sqrt{-2\ln U_1}$ term to "spread," or de-squeeze," the values out, such that recovery of exact values may be achieved.

Figure 6:
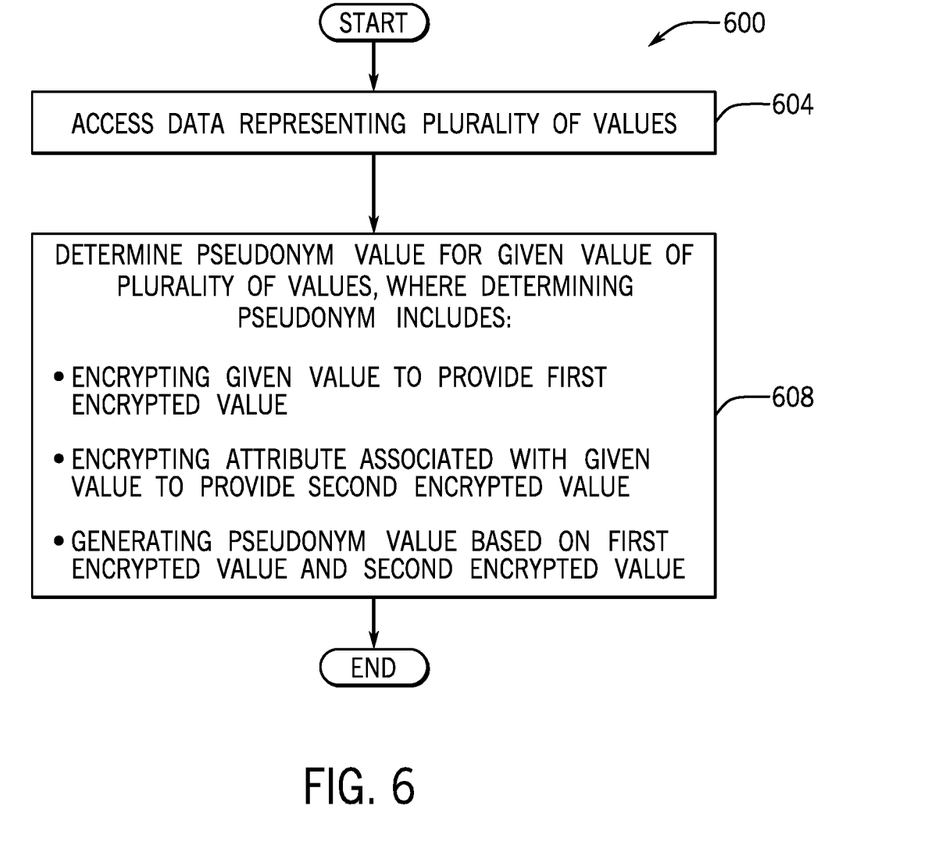
FIG. 6 is a flow diagram depicting a technique to generate a pseudonym value for a given value based on an attribute associated with the given value according to an example implementation.

Thus, referring to FIG. 6, in accordance with example implementations, a technique includes accessing data (block 604), which represents a plurality of values. Pursuant to block 608, the technique 600 includes determining a pseudonym value for a given value of the plurality of values. Determining the pseudonym value includes encrypting the given value to provide a first encrypted value; encrypting an attribute that is associated with the given value to provide a second encrypted value; and generating the pseudonym value based on the first encrypted value and the second encrypted value.

Figure 7:
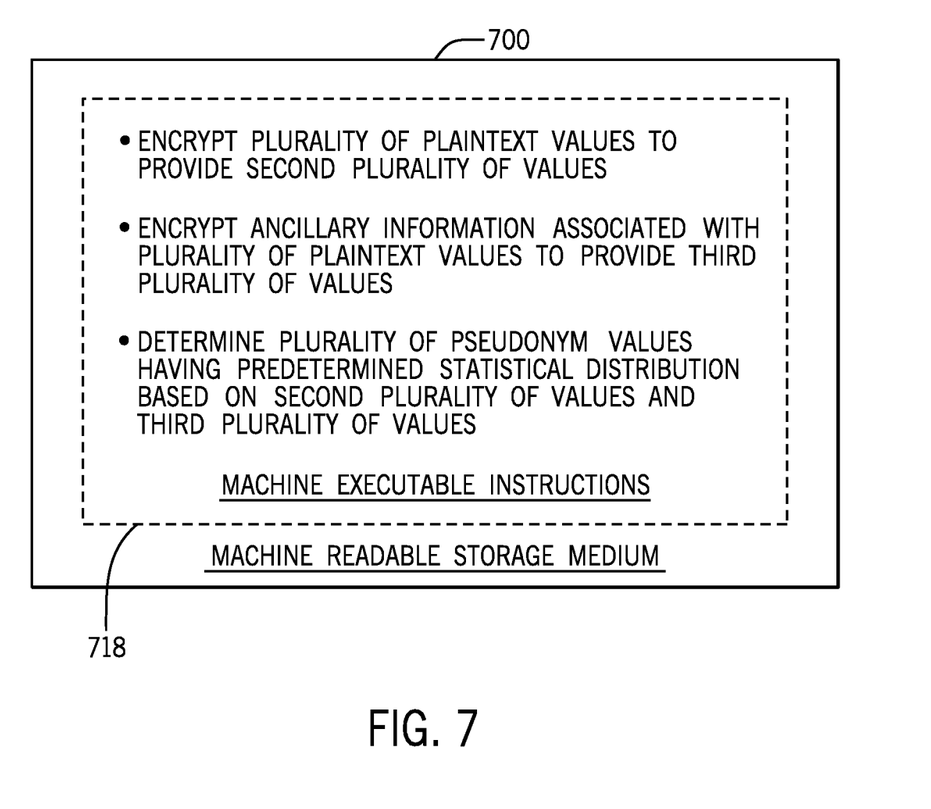
FIG. 7 is an illustration of machine executable instructions stored on a non-transitory machine readable storage medium to determine a plurality of pseudonym values having a predetermined statistical distribution according to an example implementation.

Referring to FIG. 7, in accordance with example implementations, a non-transitory machine readable storage medium 700 stores machine executable instructions 718 that, when executed by a machine, cause the machine to encrypt a plurality of plaintext values to provide a second plurality of values; and encrypt ancillary information associated with the plurality of plaintext values to provide a third plurality of values. The instructions 718, when executed by the machine, cause the machine to determine a plurality of pseudonym values having a predetermined statistical distribution based on the second plurality of values and the third plurality of values.

Figure 8:
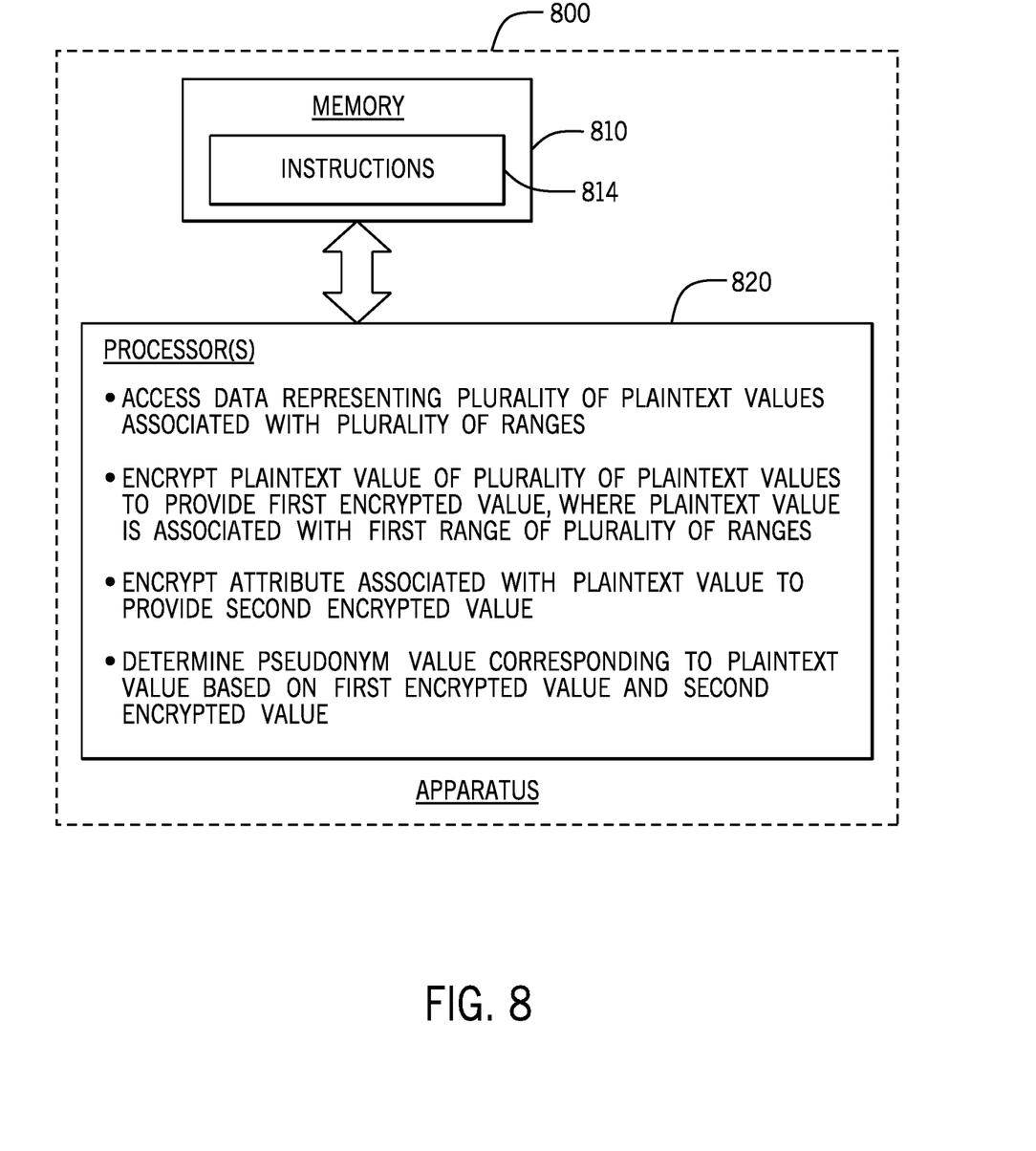
FIG. 8 is a schematic diagram of an apparatus to generate a pseudonym value for a plaintext value based on an attribute associated with the plaintext value according to an example implementation.

Referring to FIG. 8, in accordance with example implementations, an apparatus 800 includes at least one processor 820 and a memory 810 to store instructions 814 that, when executed by the processor(s) 820, cause the processor(s) 820 to access data representing a plurality of plaintext values associated with a plurality of ranges, encrypt a plaintext value of the plurality of plaintext values to provide a first encrypted value. The plaintext value is associated with a first range of the plurality of ranges. The instructions, when executed by the processor(s) 820, cause the processor(s) 820 to encrypt an attribute that is associated with the plaintext value to provide a second encrypted value; and determine a pseudonym value corresponding to the plaintext value based on the first encrypted value and the second encrypted value.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
    accessing data representing a plurality of plaintext values, wherein the plurality of plaintext values are associated with a plurality of number ranges;
    determining a pseudonym value for a given plaintext value of the plurality of plaintext values, wherein the given plaintext value is associated with a given number range of the plurality of number ranges and the pseudonym value is within the given number range, and wherein the determining comprises:
        encrypting the given plaintext value to provide a first encrypted value;
        identifying a plaintext attribute of the given plaintext value, wherein the given plaintext value represents first information about an individual, and the plaintext attribute contains identifying information that associates the first information with the individual;
        encrypting the plaintext attribute to provide a second encrypted value; and generating the pseudonym value based on the first encrypted value and the second encrypted value, wherein a variance of the first encrypted value is derived from the second encrypted value, wherein the variance is within a predetermined variance range, and wherein the variance is added to the first encrypted value.

2. The method of claim 1, wherein the encryption of the given plaintext value comprises performing format preserving encryption.

3. The method of claim 1, wherein:
    the identifying comprises identifying an index corresponding to the given plaintext value and corresponding to the individual; and
    the encryption of the plaintext attribute comprises encrypting a plaintext value derived from the index.

4. The method of claim 1, further comprising:
    determining the given plaintext value based on the pseudonym value.

5. The method of claim 1, wherein the generating comprises:
    applying a statistical distribution transformation based on the first encrypted value and the second encrypted value to determine the pseudonym value.

6. The method of claim 1, wherein encrypting the given plaintext value, tho encrypting the plaintext attribute, and the generating the pseudonym value preserve a statistical property of the plurality of plaintext values.

7. A non-transitory machine readable storage medium storing machine executable instructions that, when executed by a machine, cause the machine to:
    encrypt a plurality of plaintext values to provide a first plurality of encrypted values, wherein the plurality of plaintext values are associated with a plurality of number ranges;
    identify ancillary information correlated to the plurality of plaintext values, wherein the identification of ancillary information comprises identifying a plaintext attribute of a given plaintext value of the plurality of plaintext values, the given plaintext value of the plurality of plaintext values represents first information about an individual, wherein the plaintext attribute contains identifying information that associates the first information with the individual, and wherein the given plaintext value of the plurality of plaintext values is associated with a given number range of the plurality of number ranges, and;
    encrypt the ancillary information to provide a second plurality of encrypted values, wherein the encryption of the ancillary information comprises encrypting the plaintext attribute to provide a given encrypted value of the second plurality of encrypted values; and
    determine a plurality of pseudonym values having a predetermined statistical distribution based on the first plurality of encrypted values and the second plurality of encrypted values, wherein the plurality of pseudonym values are within the given number range, wherein a variance of the first plurality of encrypted values is derived from the second plurality of encrypted values, wherein the variance is within a predetermined variance range, and wherein the variance is added to the first plurality of encrypted values.

8. The storage medium of claim 7, wherein the instructions, when executed by the machine, further cause the machine to apply a Box-Muller transformation or a polar Marsaglia transformation based on the first plurality of encrypted values and the second plurality of encrypted values.

9. The storage medium of claim 7, wherein the predetermined statistical distribution comprises a normal distribution or a log-normal statistical distribution.

10. The storage medium of claim 7, wherein the instructions, when executed by the machine, further cause the machine to:
    determine sinusoid inputs for a statistical distribution transformation based on the first plurality of encrypted values.

11. The storage medium of claim 10, wherein the instructions, when executed by the machine, further cause the machine to:
    scale the second plurality of encrypted values to provide a scaled plurality of encrypted values and add offsets to the scaled plurality of encrypted values to generate the sinusoid inputs.

12. The storage medium of claim 7, wherein the ancillary information comprises indices corresponding to the plurality of plaintext values.

13. The storage medium of claim 7, wherein the ancillary information comprises at least one of the following: names, addresses or identification numbers.

14. An apparatus comprising:
    at least one processor; and
    a memory to store instructions that, when executed by the at least one processor, cause the at least one processor to:
        access data representing a plurality of plaintext values associated with a plurality of ranges, and wherein the plurality of plaintext values comprises a given plaintext value;
        identify a plaintext attribute of the given plaintext value, wherein the given plaintext value represents first information about an individual, and the plaintext attribute contains identifying information that associates the first information with the individual;

encrypt the given plaintext value to provide a first encrypted value, wherein the given plaintext value is associated with a first range of the plurality of ranges;

encrypt the plaintext attribute to provide a second encrypted value; and determine a pseudonym value corresponding to the given plaintext value based on the first encrypted value and the second encrypted value, wherein the pseudonym value is within the first range of the plurality of ranges, wherein a variance of the first encrypted value is derived from the second encrypted value, wherein the variance is within a predetermined variance range, and wherein the variance is added to the first encrypted value.

15. The apparatus of claim 14, wherein the plurality of ranges comprises non-overlapping ranges.

16. The apparatus of claim 14, wherein the instructions, when executed by the at least one processor, further cause the at least one processor to:

determine additional pseudonym values for additional plaintext values of the plurality of plaintext values, wherein the additional plaintext values of the plurality of plaintext values are associated with the first range, the additional pseudonym values are within the first range, the pseudonym value corresponds to the given plaintext value, and the additional pseudonym values are associated with a normal statistical distribution.

17. The apparatus of claim 14, wherein the instructions, when executed by the at least one processor, further cause the at least one processor to:

perform a succession of multiple encryption iterations; and end the succession of multiple encryption iterations in response to a last encryption iteration of the succession of multiple encryption iterations providing a ciphertext value within the first range.

18. The apparatus of claim 17, wherein the instructions, when executed by the at least one processor, further cause the at least one processor to:

in an initial encryption iteration of the succession of multiple encryption iterations, determine a first ciphertext value based on the given plaintext value; and in each subsequent encryption iteration of the succession of multiple encryption-iterations after the initial encryption iteration, determine a new ciphertext value based on a previous ciphertext value determined in an encryption iteration of the succession of multiple encryption iterations preceding each subsequent encryption iteration.

19. The apparatus of claim 17, wherein the instructions, when executed by the at least one processor, further cause the at least one processor to perform format preserving encryption of the given plaintext value to provide the first encrypted value.

\* \* \* \* \*